United States Patent [19]

Aries

[11] 3,904,746

[45] Sept. 9, 1975

[54] SYNERGIZED CARBAMIC ACID ESTER INSECTICIDAL COLLAR

[76] Inventor: Robert Aries, 69 rue de la Faisanderie, 75116 Paris, France

[22] Filed: Oct. 17, 1974

[21] Appl. No.: 515,677

[30] Foreign Application Priority Data

Oct. 17, 1973  France .............................. 73.37118
June 21, 1973  France .............................. 73.21639
Jan. 29, 1974  France .............................. 74.02935
Mar. 13, 1974  France .............................. 74.08534
Apr. 12, 1974  France .............................. 74.12921
May 16, 1974  France .............................. 74.17104

[52] U.S. Cl. ...................... 424/28; 43/124; 43/131; 43/145; 119/106; 119/156; 119/159; 424/14; 424/78; 424/300;

[51] Int. Cl.² .................. A01K 27/00; A01K 29/00 A01M/1/20

[58] Field of Search ...... 119/106, 156, 159; 43/124, 43/131, 145; 424/14, 28, 78, 300

[56] References Cited

UNITED STATES PATENTS 3,852,416  12/1974  Grubb et al .......................... 424/14

*Primary Examiner*—Shep K. Rose
*Attorney, Agent, or Firm*—Browdy and Neimark

[57] ABSTRACT

A device and a process for making it which is intended to provide domestic animals with protection against ectoparasites, these devices being made up of a composition containing a plasticised vinyl polymer and an insecticidal substance as the active principle chosen from insecticidal substances which have an LD50, in rats, at least equal to 50 mg/kg and a vapor pressure of less than 0.001 mm Hg at 25°C.

4 Claims, No Drawings

SYNERGIZED CARBAMIC ACID ESTER INSECTICIDAL COLLAR

Field of the Invention

The present invention relates to devices which are intended to provide domestic animals with protection against ectoparasites, e.g., ticks and fleas, the devices consisting of a composition containing a plasticised vinyl polymer and an insecticidal substance chosen from amongst those of which the LD50, measured on rats, is at least equal to 50 mg/kg and of which the vapor pressure is less than 0.001 mm Hg at 25°C.

BACKGROUND OF THE INVENTION

Compositions containing a plasticised polymer and a volatile insecticidal substance such as DDVP are known from French Pat. No. 1,404,681; these compositions act by means of their vapors, DDVP being a volatile material (0.02 mm Hg at 25°C).

The recently issued Grubb et al. U.S. Pat. No. 3,852,416 shows an animal collar for control of ectoparasites, which collar comprises a solid, substantially non-volatile carbamate in a plasticized thermoplastic resin, but this patent does not suggest the use of a synergist.

SUMMARY OF THE INVENTION

It has now been found that devices which were effective against parasitic insects in domestic animals can act not by means of their vapor but by the simple contact which they provide during migratory movements of the parasites from one part to another of the body of the parasite-infected animal.

Description of Preferred Embodiments

The present invention thus relates to an insecticidal device which is intended to provide domestic animals with protection against ectoparasites and which comprises the following components:

A - an active principle chosen from amongst insecticidal substances which have an LD 50, in rats, at least equal to 50 mg / kg and a vapor pressure at 25°C of less than 0.001 mm Hg, B - a solid macromolecular substance, C - a plasticiser, D - optionally, a dyestuff, a pigment, a stabiliser and a deodorant, E - optionally, a receptacle which contains the remainder of the insecticidal device and consists of a hollow shaped section made of a flexible plastic which is insoluble in the active principle and is a non-solvent or very poor solvent for the latter, this shaped section being closed at its ends and possessing orifices over its entire length, the latter being between 12 and 60 centimeters, it being possible for the receptacle to carry an attachment system, and F - optionally, a container, serving as a packaging, which is impermeable to the active principle.

The devices produced in this way possess a very much lower toxicity than the known devices based on DDVP, due to the fact that the substances used give off practically no toxic vapors as does DDVP the latter having a vapor pressure a hundred to ten thousand times greater than that of the substances used.

Another advantage of the devices of the invention resides in the fact that the stability of the substances used is very much greater than that of DDVP, especially in the presence of moisture. The animal can go out in the rain or can be bathed without any detrimental effect to the device, and this is not the case with the devices based on DDVP.

Another advantage resides in the very clean appearance of the devices, in contrast to those based on DDVP; the latter are always very unpleasant to touch, being viscous and oily.

The devices according to the invention form articles which can be used to protect domestic animals, such as collars equipped with a closing system or bands which can be fixed to an ordinary collar by sewing or any other attachment system or can be introduced into the receptacle described under E. The devices can also form fabrics made in one piece or by interlacing bands, tubes or yarns comprising the components defined above or cushions made of acrylic fibers onto which the active principle has been sprayed.

The insecticidal substances are preferably chosen from amongst pyrethroids, organo-phosphorus compounds, organo-chlorine compounds and carbamic acid esters. They can be used in conjunction with a synergistic agent chosen from amongst all those known to those skilled in the art.

The following compounds may be mentioned as nonlimiting examples of suitable insecticidal substances (the name of each substance is followed by its LD 50):

III. Carbamic acid esters

Carbaryl (540), i.e., 1 napthyl N-methyl carbamate

"Bux" (170) a mixture of 1 part m-(1-ethylpropyl) phenyl methylcarbamate to 4 parts m-(1-methyl butyl) phenyl methyl carbamate Pirimicarb (147) i.e., 2-dimethyl-amino-5,6-dimethyl pyrimidin-4-yl dimethylcarbamate Methiocarb (100) i.e., 4-methylthio-3,5xylyl-N-methyl carbamate Dioxacarb (80) i.e., 2-(1,3-dioxolan-2yl) phenyl-N-methylcarbamate Arpocarb (80), i.e., 2-isopropoxy-phenyl-N-methylcarbamate Promecarb (74) i.e., 3-isopropyl-5-methylphenyl-N-methylcarbamate Aminocarb (50) i.e., 4-dimethylamino-3-tolyl-N-methylcarbamate The invention does not exclude the other categories of insecticidal compounds such as, for example, thiocyanoacetic acid esters like "Thanite" (1,600).

The following compounds may be mentioned as non-limiting examples of suitable synergistic agents:

Piperonylbutoxide (7,500), i.e., α-[2-(2-butoxyethoxy) ethoxy]-4,5-methylenedioxy-2-propyltoluene Piprotal (4,400) i.e., piperonal bis-[2-(2-butoxyethoxy) ethyl]acetal Sesamex (2,000) i.e., 2-(2-ethoxyethoxy) ethyl 3,4-(methylenedioxy) phenyl acetal of acetaldehyde Sulphoxide (2,000) i.e., 1,2-methylenedioxy-4-[2-(octylsulfinyl) propyl]benzene Propylisome (1,500) i.e., dipropyl 5,6,7,8-tetra hydro-7-methyl naphtho[2,3d]-1,3-dioxole-5,6-dicarboxylate The amount of active principle present in the device is preferably between 5 and 20% by weight.

The macromolecular substance preferably has a molecular weight of more than 1,000; it is preferably chosen from amongst the homopolymers and copolymers prepared from vinyl chloride, vinyl acetate, acetalvinyl compounds, vinyl alcohol, vinyl-benzene, divinylbenzene and vinylidene chloride; the copolymers can moreover contain foreign components such as ethylene compounds, propylene compounds, butadienes, isoprenes, acrylic compounds and methacrylic compounds.

The macromolecular substance is preferably a polymer or a copolymer of a vinyl compound such as, for example, a polyvinyl halide. The macromolecular substances which are particularly preferred are polymers or copolymers of vinyl chloride.

The macromolecular substance preferably contains one or more plasticisers.

The plasticisers are liquid esters, the vapor pressure of which is less than 0.0001 mm Hg. at 25°C.

Diethyl, dimethyl, dipropyl, dibutyl, dihexyl, dioctyl and didecyl phthalates, dibutyl, diamyl, dinonyl, dioctyl and didecyl adipates, dipropyl, dibutyl, dibenzyl and dioctyl sebacates, diethyl, dipropyl and dibutyl citrates, triphenyl and tricresyl phosphates and triglycerides may be mentioned as non-limiting examples of plasticisers.

The preferred plasticisers are dibutyl phthalate and dioctyl adipate which make it possible to produce a device which possesses good flexibility and at the surface of which the active principle appears quickly and uniformly.

Suitable stabilisers are any of those known for the active principle, amongst which there may be mentioned epoxides such as epichlorohydrin, calcium, magnesium or potassium stearates, the laurates and palmitates of these same metals, chlorinated terphenyls and butoxypropylene glycol. The preferred stabilisers are calcium or magnesium stearates and epoxidised soya oil.

Suitable deodorants are any of those which are capable of masking the smell of the active principle and of the impurities which it contains and which are tolerated by domestic animals. Coumarin and vanillin are examples of such compounds.

When the hollow shaped section is utilized, the material of which it is made is preferably chosen from amongst polyethylene, polypropylene or polyamide; its shape, in cross-section, is not critical; for example, it can be circular, elliptical, semi-circular, lenticular, square or rectangular; its internal diameter is calculated as a function of the band which it has to contain and is thus substantially greater than the thickness of the latter; the wall thickness of the shaped section is preferably between 0.5 and 2 mm; such shapes and dimensions can be produced easily by extrusion.

The ends of the shaped section are closed, for example by welding or by one or more rivets.

The orifices, considered together, preferably represent a total open surface area such that the ratio of the latter, expressed in cm$^2$, to the weight of insecticidal composition A + B + C + D, expressed in grams, is between 0.5 and 1.

The shape of the orifices is not critical; it can be circular, square, rectangular, diamond-shaped, star-shaped or of any other pleasing shape.

The orifices are preferably distributed over at most half of the circumference of the hollow shaped section so as to prevent the active composition from coming into contact with the neck of the animal.

The attachment system can consist of a buckle fixed to one end of the shaped section, the other end carrying a flat flexible band which is suitable for the buckle and which may or may not be perforated depending on the type of buckle, the band being is made of leather or plastic of the same nature as that of the shaped section. Both ends of the shaped section can also each carry a buckle element which makes it possible to effect closure by joining the two elements.

The attachment system can also be a set of hooks which are distributed along the shaped section and which make it possible to fix the latter to the usual collar of the animal to be protected.

The invention also relates to the processes for manufacturing the devices. According to one of these processes, the constituents A, B, C and D are mixed intimately and the mixture is heated at about 120°C for 30 minutes in a preferably closed chamber so as to produce a powder which is optionally passed through a mill. This powder is used to form the device as desired, either by extrusion or by molding in a piece of equipment known to those skilled in the art. The operation is carried out at a temperature preferably between 160° and 200°C. The product is then cooled in a bath of water or by a stream of nitrogen.

In this process, the active principle A can be especially employed in solution in a solvent chosen from amongst succinic and maleic acid esters, hydrocarbons and ketones. Such a solution can contain a surface-active agent, as in the case of emulsifiable solutions, without this causing inconvenience.

The active principle can also be used in the form of a powder composition containing an inert powder such as a talc, a silica, a silicate, a kaolin, a dried clay or an alkaline earth metal carbonate or magnesium carbonate. Such a powder composition can contain a surface-active agent, as in the case of wettable powders, without this causing inconvenience.

According to another manufacturing process, the desired article is produced directly, in the desired shape and dimensions, and embedded in its packaging. According to this process, a solid material which has the desired shape and is made of the preferably plasticised macromolecular substance B, an active liquid containing the active principle A, and optionally a plasticiser C, which is a solvent for the active principle, and the dyestuffs, pigments, stabilisers and deodorants D are placed inside a container F which acts as a packaging, is impermeable to the active liquid and the internal volume of which is such that the active liquid is in contact with at least a part of the surface of the material B; the container is then closed in a leakproof manner and the whole is stored at a temperature of between 20°C and 80°C for a period of time which is inversely proportional to the temperature but which is at least one day.

During storage, the active liquid passes, without any external intervention, into the solid material throughout which it becomes uniformly distributed by absorption.

In this process, the active liquid can contain, in addition to the active principle and the optional constituents C and D, a solvent chosen from amongst succinate and maleate esters such as the propyl, butyl, pentyl, hexyl, heptyl, octyl and decyl esters.

The material B can be prepared by any known methods for processing and shaping plastics, such as molding by casting, casting on an endless belt, extrusion through a flat or annular die, calendering, and spinning by dry or wet extrusion, followed by weaving or agglomeration.

In the techniques which are effected by molding, the solid material B is generally obtained directly in its final shape and dimensions.

In the other techniques, a semi-finished product is obtained which is thereafter shaped by sectioning, sawing, shaping, stamping, gluing, welding and the like.

The solid material has any form whatsoever, provided that it gives a ratio of surface area available for contact with the active liquid to volume at least equal to 2 in the CGS system. The preferred forms are plates, sheets, tapes, tubes and profiled rings, and, amongst the latter, particularly the forms of plates, tubes and tabs which can be placed around a domestic animal.

Various structures can be used; the solid material B is, depending on the particular case, fibrous, cellular, spongy, laminated, felted or woven, but preferably compact or hollow. In the case of a compact mass, the ratio of impregnation surface area to volume can be increased by providing a surface state which is not smooth, such as a wavy, stippled, perforated or grooved surface.

The shape and the nature of the container are not critical, but it is necessary that the container should be such that the active liquid is in contact with at least a sufficient part of the surface of the material B to permit, after the storage period, homogeneous penetration of the active liquid and its uniform distribution throughout the material B; the container must be of sufficient dimensions to enable all the material B and the active liquid to be accommodated therein. It is desirable that the solid material B should be completely immersed in the active liquid during most of the impregnation period. In order to fulfill the latter condition, the container is preferably a flexible bag, the shape of which is similar to that of the solid material B. The weight of active liquid to be absorbed according to the process is in a proportion of 0.1 to 2 parts of liquid per one part of B; when a solid material B shaped in the form of a plate, a sheet, a tape or a profiled ring is used, this proportion is preferably between 0.2 and 1 part of liquid per one part of B; when a solid material B of laminated, fibrous, felted or woven structure is used, this proportion is preferably between 0.4 and 1.5 parts of liquid per one part of B; and when a solid material B of cellular or spongy structure is used, this proportion is preferably between 1 and 2 parts of liquid per one part of B.

The order in which the solid mass and the active liquid are introduced into the container does not affect the mechanism of impregnation, but it has been found that it was more practical to introduce the solid material first.

The container is closed in a leakproof manner by means of one of the methods which are well known in the packaging industry, such as, for example, stoppering, welding, gluing or crimping. The preferred method is welding. Depending on the nature of the packaging material, the welding is effected by direct heat transfer, by infra-red radiation or by a high frequency current. According to a variant, the leakproof container is sealed after the air has been evacuated. The container from which the air has been evacuated in this way generally removes the risk that the device will exude when it is stored. It is also possible to create a vacuum inside the container before sealing, subject to the condition that any re-entry of air during the sealing process is prevented.

The minimum period of storage to effect impregnation of the solid material with all the active liquid depends on the nature and the structure of the solid material B and the nature of the active liquid. Moreover, the minimum storage period decreases when the ratio of surface area to volume of the solid material increases, when the weight ratio of solid to liquid increases and when the temperature increases.

The temperature at which storing is carried out is preferably between +20° and +60°C.

The minimum storage period necessary for impregnation is preferably between 3 and 30 days.

A particularly valuable variant of the general process consists of using a solid material which possesses a central cavity into which the active liquid to be absorbed is introduced.

This variant avoids direct contact between the liquid and the walls of the container and permits faster impregnation. According to this variant, the solid material B is flexible. The material B is preferably given the shape of a flat bag or the shape of a tube with elliptical, or better, lenticular internal and external cross-sections. in the case of a tube with a lenticular cross-section, one of its ends is closed by welding; the active liquid is introduced inside and then the other end of the tube is closed by welding, leaving the minimum amount of air inside the tube. The whole is then placed in a leakproof container and stored as is generally effected in the process. After complete impregnation, the material B substantially assumes the shape of a flat strip. In this variant, the preferred embodiments use a material B in the form of tubes with a lenticular cross-section, the dimensions of which lie between the following figures: width (flattened tube) 1.5 to 6 cm, length 10 to 60 cm, and wall thickness 1 to 5 mm.

For the realisation of such a variant, a container is preferably used which consists of a multi-layer plastic sheet of the type known in the packaging field by the name of "complex."

Some examples are given below for the sole purpose of illustrating the invention, without thereby limiting it.

Examples

Insecticidal collars for large or medium-sized dogs

A - Composition

| 3. | Arpocarb | 6% |
|---|---|---|
| | Dibutyl phthalate | 33% |
| | Blue pigment | 1% |
| | Polyvinyl chloride | 60% |

B - Presentation

The mixture, which is obtained hot (approximately 180°C) is cast on a cold surface and cut up into plates or thin strips or is extruded to the desired shape and size. An attachment system can be fixed either by welding or by means of clips or rivets. The thin strips can also be placed in hollow shaped sections as has been stated above. The length of the collar thus formed is fitted around the neck of the animal for which it is intended; it is also possible to make only a large size which is then suited to the size of the animal by cutting and removing the excess portion. The device can also be formed into a hollow band through which a tape or a leather band equipped with an attachment system is passed; the hollow band is produced by extrusion or by joining two flat bands of low thickness by welding or by sewing; in the latter case, one of the two bands, for example that intended to face the neck of the animal, can be of an inert nature such as, for example, a gauze, a leather or a polymer like those which have been mentioned in relation to the hollow profiled casing. It is also possible to use the cut-out plates as insecticidal covers in dog-kennels.

I claim

1. In an animal collar having a buckel means attached thereto, for the control of fleas and ticks on cats and dogs, the improvement consisting of:

a solid non-volatile insecticidal composition which consists essentially of a mixture of a synergistically effective amount of a synergist and 5–20% of a carbamic acid ester selected from the group consisting of a 1-napthyl-N-methylcarbamate; a mixture of 1 part m-(1-ethylpropyl) phenyl methylcarbamate to 4 parts m-(1-methylbutyl) phenyl methylcarbamate; 2-dimethylamino-5, 6-dimethylpyrimidin-4-yl dimethylcarbamate; 4-methylthio-3,5-xylyl-N-methylcarbamate; 2-(1,3-dioxolan-2yl) phenyl-N-methylcarbamate; 2-isopropoxy-phenyl-N-methylcarbamate; 3-isopropyl-5-methylphenyl-N-methylcarbamate; and 4-dimethylamino-3-tolyl-N-methylcarbamate;

and said synergist being selected from the group consisting of piperonyl butoxide; piperonal bis[2-(2-butoxyethoxy) ethyl] acetal; 2-(2-ethoxyethoxy) ethyl 3,4-(methylene dioxy) phenyl acetal of acetaldehyde; 1,2-methylenedioxy-4-[2-(octylsulfinyl) propyl] benzene and dipropyl 5,6,7,8-tetrahydro-7-methyl naptho [2,3d]-1, 3-dioxole-5,6-dicarboxylate in a plasticized solid thermoplastic vinyl resin, whereby said animal collar effectively contacts ectoparasites on the body of the ectoparasite infected animal during migratory movements of the ectoparasites from one part to another of the body of the ectoparasite infected animal.

2. Device according to claim 1, characterised in that the thermoplastic vinyl resin is a polymer or a copolymer of vinyl chloride.

3. Device according to claim 1, characterised in that the collar has the form of a band, the length of which can be adjusted by cutting at the time of use.

4. In a method for the control of fleas and ticks on cats and dogs by the step of providing a buckled collar around the neck of the cat or dog, wherein said collar is formed of a solid insecticidal composition, the improvement wherein said solid insecticidal composition consists essentially of a mixture of a synergistically effective amount of a synergist and 5–20% of a carbamic acid ester selected from the group consisting of 1-naphthyl-N-methylcarbamate; a mixture of 1 part m-(1-ethylpropyl) phenyl methylcarbamate to 4 parts m-(1-methylbutyl) phenyl methylcarbamate; 2-dimethylamino-5,6-dimethylpyrimidin-4-yl dimethylcarbamate; 4-methylthio3,5-xylyl-N-methylcarbamate; 2,(1,3-dioxolan-2yl) phenyl-N-methylcarbamate; 2-isopropoxy-phenyl-N-methylcarbamate; 3-isopropyl-5-methylphenyl-N-methylcarbamate; and 4-dimethylamino-3-tolyl-N-methylcarbamate, and said synergist being selected from the group consisting of piperonyl butoxide; piperonal bis-[2-(2-butoxyethoxy) ethyl] acetal; 2-(2-ethoxyethoxy) ethyl 3,4-(methylene dioxy) phenyl acetal of acetaldehyde; 1,2-methylenedioxy-4-[2-(octylsulfinyl) propyl] benzene and dipropyl 5,6,7,8-tetrahydro-7-methyl naptho [2,3d]-1, 3-dioxole-5,6-dicarboxylate in a plasticized solid thermoplastic vinyl resin, whereby said animal collar effectively contacts ectoparasites on the body of the ectoparasite infected animal during migratory movements of the ectoparasites from one part to another of the body of the ectoparasite infected animal.

* * * * *

UNITED STATES PATENT OFFICE
CERTIFICATE OF CORRECTION

PATENT NO. : 3,904,746
DATED : September 9, 1975
INVENTOR(S) : Robert Aries

It is certified that error appears in the above-identified patent and that said Letters Patent are hereby corrected as shown below:

[30] Foreign Application Priority Data, line 2,

June 21, 1974 France ........ 74.21639

Signed and Sealed this twenty-fourth Day of February 1976

[SEAL]

Attest:

RUTH C. MASON
Attesting Officer

C. MARSHALL DANN
Commissioner of Patents and Trademarks